(12) United States Patent
Straumann et al.

(10) Patent No.: US 8,979,035 B2
(45) Date of Patent: Mar. 17, 2015

(54) ZERO-SHOCK SEPARATION SYSTEM

(75) Inventors: Franz Straumann, Elgg (CH); Richard Von Arx, Uster (CH)

(73) Assignee: RUAG Schweiz AG, Zurich (CH)

( * ) Notice: Subject to any disclaimer, the term of this patent is extended or adjusted under 35 U.S.C. 154(b) by 990 days.

(21) Appl. No.: 12/912,185

(22) Filed: Oct. 26, 2010

(65) Prior Publication Data

US 2011/0114793 A1 May 19, 2011

Related U.S. Application Data

(60) Provisional application No. 61/262,381, filed on Nov. 18, 2009.

(51) Int. Cl.
*B64G 1/64* (2006.01)

(52) U.S. Cl.
CPC .............. *B64G 1/641* (2013.01); *B64G 1/645* (2013.01)
USPC ..................................... 244/173.3; 244/173.1

(58) Field of Classification Search
USPC .......... 244/173.1, 173.2, 173.3, 158.1, 172.4, 244/172.5
See application file for complete search history.

(56) References Cited

U.S. PATENT DOCUMENTS

| | | | | | |
|---|---|---|---|---|---|
| 3,420,470 | A | * | 1/1969 | Meyer | 244/173.3 |
| 3,564,564 | A | * | 2/1971 | Paine | 3/327 |
| 4,715,565 | A | * | 12/1987 | Wittmann | 244/173.1 |
| 5,318,255 | A | * | 6/1994 | Facciano et al. | 244/158.1 |
| 5,520,476 | A | * | 5/1996 | Marks et al. | 403/322.3 |
| 5,743,492 | A | * | 4/1998 | Chan et al. | 244/118.2 |
| 5,969,287 | A | * | 10/1999 | Blain et al. | 102/378 |
| 6,076,467 | A | * | 6/2000 | Cespedosa et al. | 102/378 |
| 6,227,493 | B1 | * | 5/2001 | Holemans | 244/173.1 |
| 6,343,770 | B2 | * | 2/2002 | Holemans | 244/173.3 |
| 6,357,699 | B1 | * | 3/2002 | Edberg et al. | 244/173.3 |
| 6,390,416 | B2 | * | 5/2002 | Holemans | 244/173.3 |
| 6,454,214 | B1 | * | 9/2002 | Smith | 244/173.1 |
| 6,648,543 | B2 | * | 11/2003 | Arulf | 403/334 |
| 6,712,542 | B2 | * | 3/2004 | Buder | 403/374.2 |
| 7,861,976 | B2 | * | 1/2011 | Holemans | 244/173.3 |
| 7,922,125 | B2 | * | 4/2011 | Lancho Doncel | 244/173.1 |
| 2005/0230562 | A1 | * | 10/2005 | Buehler | 244/173.1 |
| 2006/0145016 | A1 | * | 7/2006 | Renfro | 244/158.1 |
| 2007/0080260 | A1 | * | 4/2007 | Lancho Doncel | 244/173.1 |

\* cited by examiner

*Primary Examiner* — Tien Dinh
*Assistant Examiner* — Steven Hawk
(74) *Attorney, Agent, or Firm* — McCormick, Paulding & Huber LLP (57) ABSTRACT

A system and corresponding method for a launch vehicle or spacecraft for releasably connecting a first body (100) with a first interface (101) and a second body (200) with a second matching interface (201), said system comprising: a belt (300) for releasably securing said first body (100) to said second body (200); a circumferential trench (203) at said second interface (201) for receiving said belt (300) in order to provide for a fixation of said belt (300) with relation to said second body (200); mechanical fixation means (301) attaching said belt (300) to said first body (100), said mechanical fixation means (301) being provided to enable a circumferential shifting movement of said belt (300) with respect to said circumference of said first body (100) in order to initiate a separation of the first body (100) from the second body (200), wherein said circumferential shifting movement induces a relative movement of said belt (300) with respect to said circumference of said first body (100) in order to remove said belt (300) from said trench (203), and wherein the system further comprising a releasing mechanism (303) causing said circumferential shifting movement.

10 Claims, 9 Drawing Sheets

ZERO-SHOCK SEPARATION SYSTEM

CROSS REFERENCE TO RELATED APPLICATIONS

The present application claims the benefit of U.S. Provisional Patent Application 61/262,381 filed on Nov. 18, 2009, the disclosure of which is herein incorporated by reference.

FIELD OF THE INVENTION

The present invention relates to a zero-shock separation system for a launch vehicle or spacecraft for releasably connecting a first body with a second body, especially for connecting a payload fairing to the body of a launch vehicle or spacecraft.

BACKGROUND OF THE INVENTION

It is a common requirement for spacecrafts that two bodies, also called stages have to be releasably connected to each other. Due to the extreme conditions during takeoff and flight, these connections have to be extremely stable but at the same time a quick and reliable separation of the two bodies has to be ensured.

In known separation systems, the first body, e.g. the payload fairing is connected to the second body, e.g. the body of the launch vehicle or spacecraft by the use of a pre-tensioned belt which is released/cut/disengaged when release of the first body from the second body is needed. This release is usually initiated once the launch vehicle or payload has reached a predetermined altitude/orbit.

However, when such a pre-tensioned belt is suddenly released/cut/disengaged, a strong, undesirable shock arises which is transmitted to the launch vehicle or payload. Such a shock can be dangerous since it might affect the integrity or the trajectory of the launch vehicle or payload.

Furthermore, due to the size of the two bodies that needs to be releasably connected, the pre-tensioning of the belt, as it is conventionally done, might prove to be a difficult task. Additionally, said tension in the belt might even cause an undesirable deformation of one of the two bodies.

Technical Problem to be Solved

The objective of the present invention is thus to eliminate these disadvantages and to provide a system for a launch vehicle or spacecraft for releasably connecting a first body with a second body wherein the separation of the two bodies can be initiated without causing a shock. A further objective of the present invention is to eliminate the difficult step of pre-tension the belt during connection of the two bodies. An even further objective of the present invention is to ensure that neither of the two bodies connected suffers a deformation due to the connection.

SUMMARY OF THE INVENTION

The above-identified objective of the present invention is solved by a system for a launch vehicle or spacecraft for releasably connecting a first body with a first interface and a second body with a second matching interface, said system comprising: a belt for releasably securing said first body to said second body, a circumferential trench at said second interface for receiving at least a circumferential portion of said belt in order to provide for a fixation of said circumferential portion of said belt with relation to said second body, further comprising mechanical fixation means attaching said circumferential portion of said belt to a circumference of said first body, said mechanical fixation means being provided to enable a circumferential shifting movement of said circumferential portion of said belt with respect to said circumference of said first body in order to initiate a separation of the first body from the second body, said circumferential shifting movement inducing a relative movement of said circumferential portion of said belt with respect to said circumference of said first body in order to remove said circumferential portion of said belt from said trench, and comprising a releasing mechanism causing said circumferential shifting movement.

The above-identified objective of the present invention is also solved by a method for a launch vehicle or spacecraft for releasably connecting a first body with a first interface and a second body with a second matching interface, the method comprising the steps of: providing a belt for releasably securing said first body to said second body; providing a circumferential trench at said second interface for receiving at least a portion of said belt in order to provide for a fixation of said portion of said belt with relation to said second body; attaching said portion of said belt to a circumference of said first body by mechanical fixation means; causing a circumferential shifting movement of said portion of said belt with respect to said circumference of said first body in order to initiate a separation of the first body from the second body, by means of a releasing mechanism; wherein said circumferential shifting movement induces a relative movement of said portion of said belt with respect to said circumference of said first body in order to axially remove said portion of said belt from said trench.

Advantageous Effects

In view of the drawbacks of the prior art, the objective of the present invention and the inventive solution summarized above, the present invention has the main advantage that the separation of the two bodies can be initiated in a smooth way, without a shock or sudden vibration and without the need of pre-tensioning the belt.

A further advantage of the present invention is that the assembly/connection of the two bodies is significantly simplified by elimination of the difficult step of pre-tensioning the belt.

An even further advantage of the present invention is that deformation of either of the two bodies due to the connection is excluded.

BRIEF DESCRIPTION OF THE DRAWINGS

Further characteristics and advantages of the invention will in the following be described in detail by means of the description and by making reference to the drawings.

FIG. 3A-3C are a sequence of schematic cross sections of the first embodiment the system of the present invention along line B-B' on FIG. 2, depicting the steps of:

FIG. 11A-11C are a sequence of schematic cross sections of preferred embodiment the system of the present invention, depicting details of the first interface and the second interface comprising first retention means and second retention means, in the steps of:

FIG. 16A-16C are a sequence of schematic cross sections of the further embodiment of the system of the present invention along line K-K' on FIG. 15, depicting the steps of:

It shall be noted that the figures are not drawn to scale and that certain details have been drawn out of scale for clarity.

DESCRIPTION OF THE PREFERRED EMBODIMENTS

Certain terms will be used in this patent application, the formulation of which should not be interpreted to be limited by the specific term chosen, but as to relate to the general concept behind the specific term.

The terms launch vehicle or spacecraft shall mean in the context of the present invention any type of launch vehicle or spacecraft such as a rocket, space-ship or space-station. When referring to a belt, any kind of longitudinal fixation means shall be understood which may act as a circumferential fixation. The term belt shall not be limited to a fully closed circumference.

The term trench shall be used with the meaning of any kind of groove, cut, or any long narrow furrow or channel. The term interface and corresponding matching interface shall be used to refer to a pair of form fitted segments having matching profiles.

Figure 1:
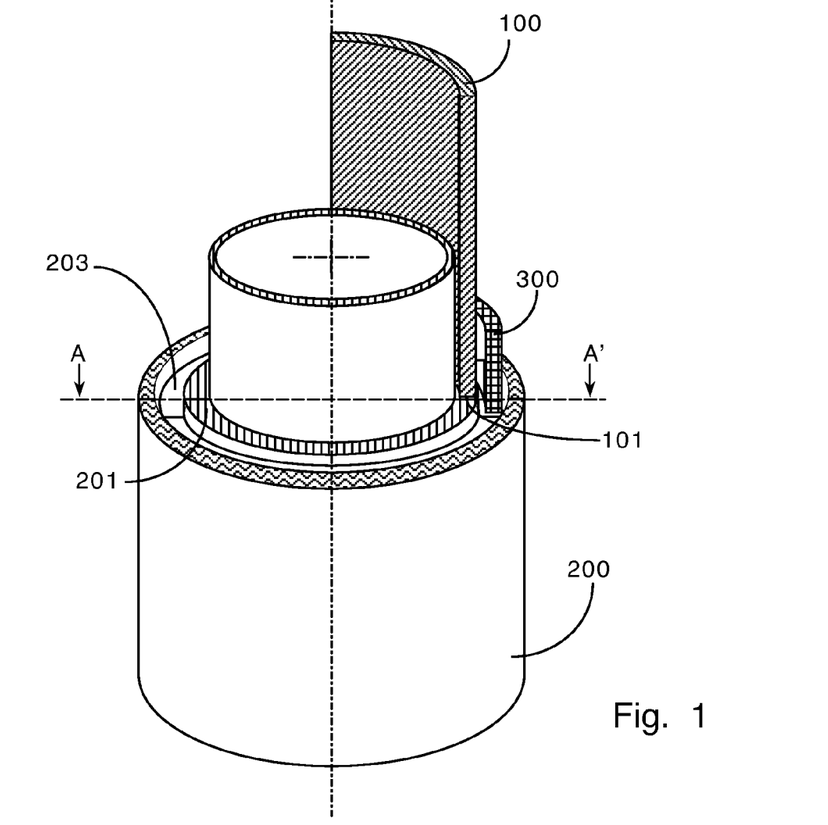
FIG. 1 is a schematic perspective diagram, depicting a first embodiment the system of the present invention, wherein the first body and the second body are coaxially arranged one around the other and the belt is axially received in said circumferential trench for a radial fixation with relation to the second body and wherein said induced relative movement of the belt is an axial movement.

FIG. 1 shows a schematic perspective diagram, depicting a first embodiment the system of the present invention. A first body 100, here a circumferential quarter segment of a cylinder, with a first interface 101 is connected with a second interface 201 of a second body 200, here a cylindrical body. In this embodiment of the invention, the first body and the second body are coaxially arranged one around the other. The second interface 201 of the second body 200 is further provided with a circumferential trench 203 for axially receiving, preferably along a common longitudinal axis A0 of the first body 100 and the second body 200, at least a circumferential portion of the belt 300. When said circumferential portion of the belt 300 is received in the circumferential trench 203, a radial fixation of the belt 300 with relation to the second body 200 is achieved. As seen on FIG. 1, the belt 300 surrounds, at least partially, the first body 100 and thus when it is radially fixed with respect to the second body 200 it provides a corresponding radial fixation of the first body 100 with respect to the second body 200 too.

Figure 2:
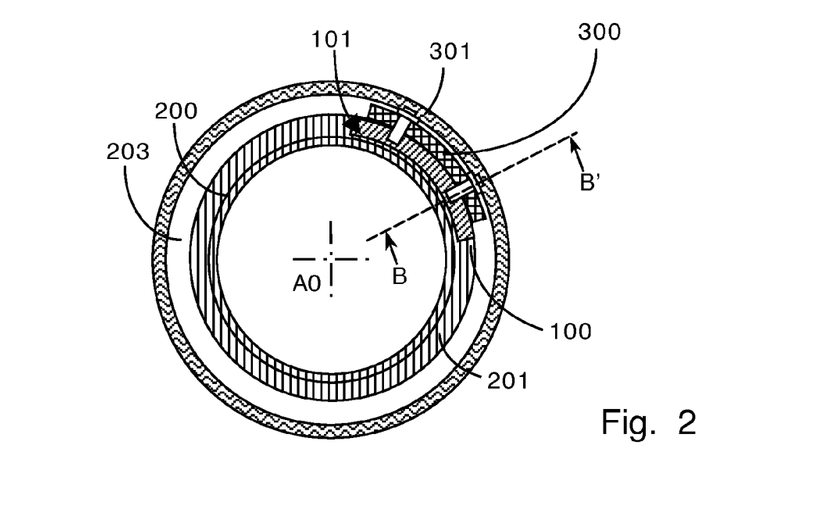
FIG. 2 is a schematic cross-section of the first embodiment the system of the present invention along line A-A' on FIG. 1.

FIG. 2 depicts a cross-section of the first embodiment the system of the present invention along line A-A' on FIG. 1. The arrangement of the first body 100 around a circumferential segment of the second body 200 is clearly shown here. The belt 300, fixed within the circumferential trench 203, surrounds at least partially the first body 100 and is fixed thereto by mechanical fixation means 301. These mechanical fixation means 301 attach a circumferential portion of the belt 300 to a circumference of the first body 100.

Figure 3A:
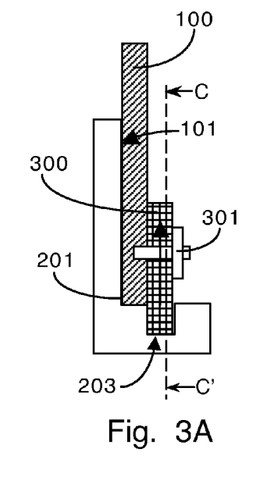
FIG. 3A: connection of the two bodies.
Figure 3B:
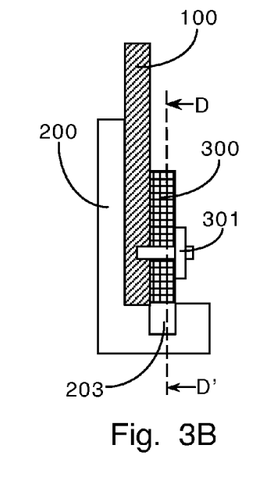
FIG. 3B: initiation of the separation.
Figure 3C:
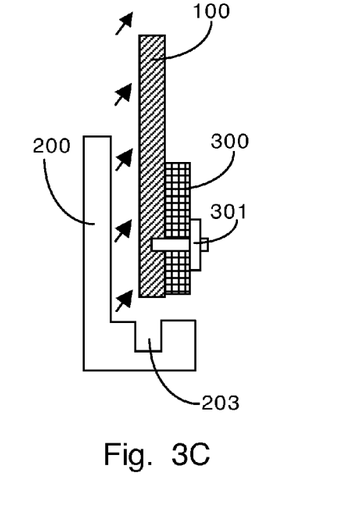
FIG. 3C: separation of the two bodies.

FIGS. 3A to 3C depict a sequence of schematic cross sections of the first embodiment the system of the present invention along line B-B' on FIG. 2.

FIG. 3A shows the system of the present invention when the first body 100 is connected to the second body 200 by means of the belt 300 being radially fixed in the circumferential trench 203. By a corresponding profile of the circumferential trench 203, a radial dislocation of the belt 300 from the circumferential trench 203 is prevented. Thus, the first body 100 is radially fixed with respect to the second body 200.

FIG. 3B shows the system of the present invention when the separation of the first body 100 from the second body 200 has been initiated by inducing an axial movement of said circumferential portion of said belt 300 with respect to said circumference of said first body 100 in order to axially remove said circumferential portion of said belt 300 from said circumferential trench 203. Thus, as seen on this FIG. 3C, once belt 300 is not retained anymore in the circumferential trench 203, the first body 100, with the belt 300 attached is free to radially separate from the second body 200.

Figure 4A:
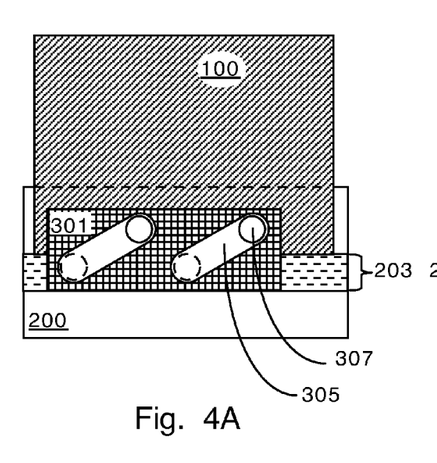
FIG. 4A is a cross section of the first embodiment the system of the present invention along the line C-C' on FIG. 3A, depicting details of the mechanical fixation means while the two bodies are connected.

FIG. 4A shows a cross section of the first embodiment the system of the present invention along the line C-C' on FIG. 3A, depicting details of the mechanical fixation means 301 while the first body 100 is connected to the second body 200 and said belt 300 is received in the circumferential trench 203. In the depicted embodiment, the mechanical fixation means 301 comprises at least a pair of one elongated and inclined hole 305 and a bolt 307.

Figure 4B:
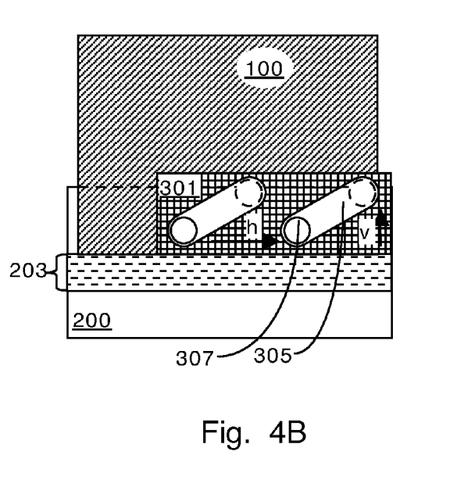
FIG. 4B is a cross section of the first embodiment the system of the present invention along the line D-D' on FIG. 3B, depicting details of the mechanical fixation means at the initiation of the separation.

FIG. 4B depicts a cross section of the first embodiment the system of the present invention along the line D-D' on FIG. 3B, depicting details of the mechanical fixation means 301 at the initiation of the separation of the first body 100 from the second body 200, showing the collaboration of the bolt 307 with the elongated and inclined hole 305 so that a circumferential shifting movement indicated by arrow h induces an axial movement indicated by arrow v. The circumferential shifting movement indicated by arrow h will lead to the belt 300 being removed from the circumferential trench 203, releasing it from the radial fixation enforced by the circumferential trench 203, allowing the first body 100 to separate from the second body 200.

However, other suitable fixation means 301 can be used to cause the release of the belt 300 from the circumferential trench 203. Such as electronically or pyrotechnically initiated separators as known in the art.

Figure 5:
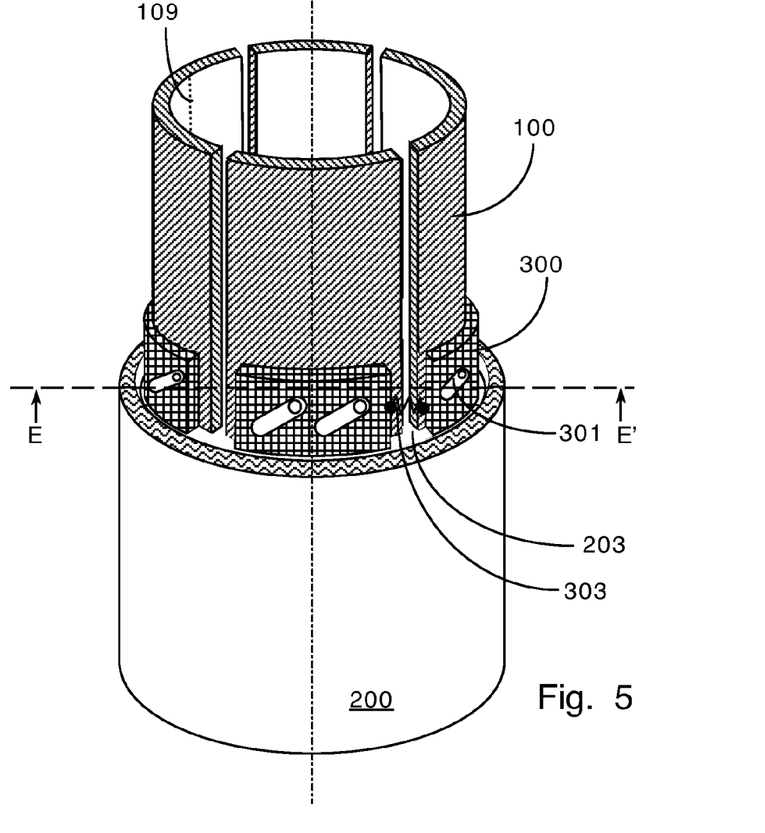
FIG. 5 is a schematic perspective diagram, depicting a second embodiment the system of the present invention, wherein multiple first bodies are connected to the second body by a multitude of belts and corresponding multitude of mechanical fixation means.

FIG. 5 is a schematic perspective diagram, depicting a second embodiment the system of the present invention, wherein multiple first bodies 100 are connected to the second body by a multitude of belts 300 and corresponding multitude of mechanical fixation means 301. The four segmented first bodies 100 are preferably symmetrical. The concept of radial fixation by means of the belt 300 being received in a circumferential trench 203 described in relation with the first embodiment apply in this embodiment as well to each individual first body 100 and corresponding belts 300, each with corresponding multitude of mechanical fixation means 301. It is to be pointed out that the although FIG. 5 shows a one-to-one relation between the number of belts 300 and the number of first bodies 100, this is not a requirement of the present invention, as multiple first bodies 100 may be fixed with a single belt 300 and multiple belts 300 could be employed for fixing a single first body 100.

Figure 6:
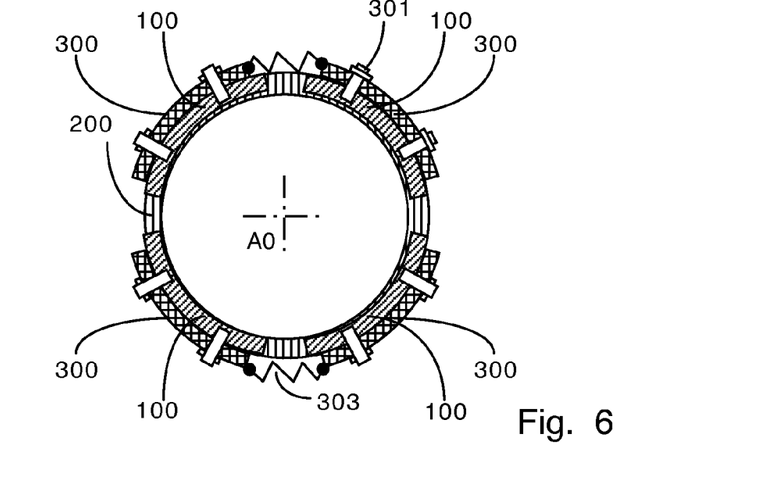
FIG. 6 is a schematic cross-section of the second embodiment the system of the present invention along line E-E' on FIG. 5.

FIG. 6 represents a schematic cross-section of the second embodiment the system of the present invention along line E-E' on FIG. 5 wherein multiple first bodies 100 are connected to the second body by a multitude of belts 300 and corresponding multitude of mechanical fixation means 301.

Figure 7:
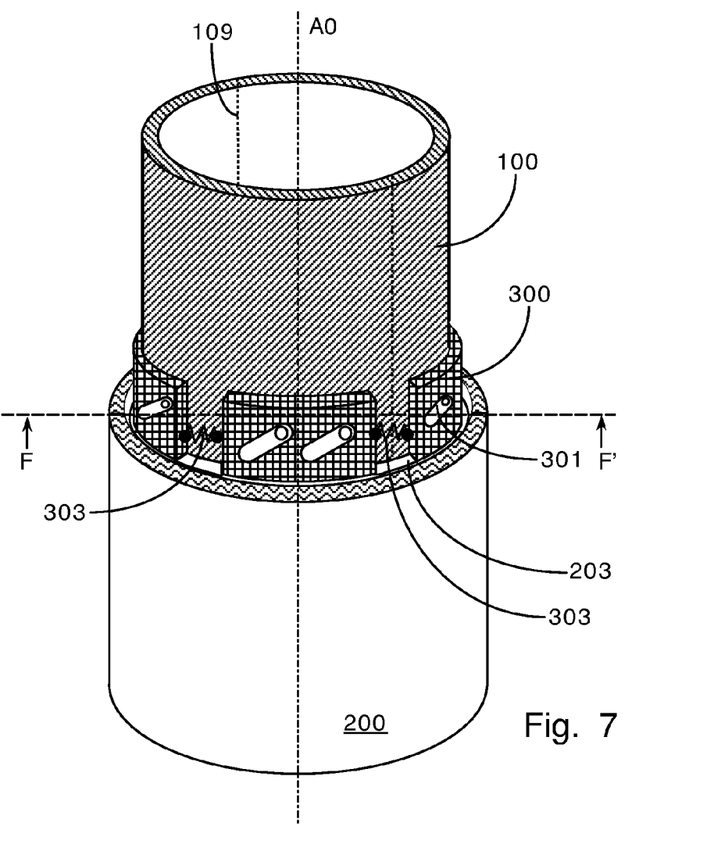
FIG. 7 is a schematic perspective diagram, depicting a third embodiment the system of the present invention, wherein a single first body is connected to the second body by a multitude of belts and corresponding multitude of mechanical fixation means.

FIG. 7 is a schematic perspective diagram, depicting a third embodiment the system of the present invention, wherein a single first body 100 is connected to the second body 200 by a multitude of belts 300 and corresponding multitude of mechanical fixation means. Furthermore, FIG. 7 shows a pair of separation means 109 for allowing said first body 100 to separate into segments, two halves in the depicted examples. The separation means 109 are of the type known in the art, such as explosive charges, tension initiated separators, releasable joints, heat dissolved adhesives, etc.

Also shown on FIG. 7 are releasing mechanisms 303 provided for circumferentially connecting adjacent belts 300. These releasing mechanisms 303 have two functions:

initiating a circumferential shifting movement of the belt 300 in order to initiate the separation of the first body 100 from the second body 200;

in a preferred embodiment of the present invention, the releasing mechanisms 303 also allows two adjacent circumferential portions of the belt 300 to be releasably joint. As the separation of the first body 100 from the second body 200 is initiated the releasing mechanisms 303 disconnect said adjacent circumferential portions of the belt 300, allowing the later to separate.

Figure 8:
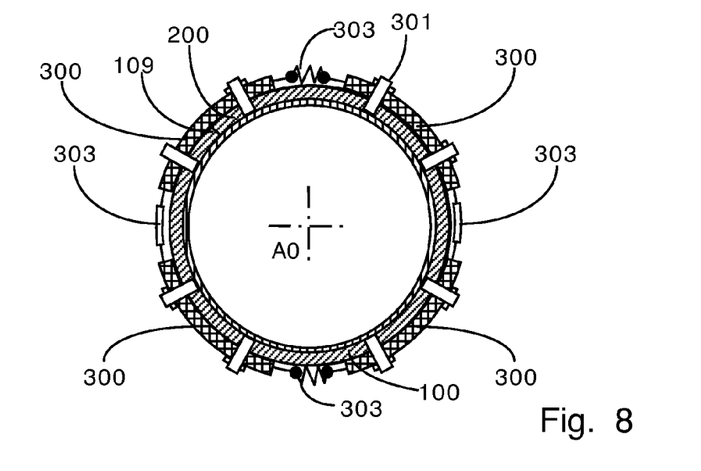
FIG. 8 is a schematic cross-section of the third embodiment the system of the present invention along line F-F' on FIG. 7.

FIG. 8 shows a schematic cross-section of the third embodiment the system of the present invention along line F-F' on FIG. 7, also depicting the circumferential arrangement of multiple belts 300 connected by corresponding releasing mechanisms 303. As shown here, the releasing mechanism 303 may be a releasable tensioned spring, or some other remotely activatable release mechanism forcing the corresponding circumferential portions of the belt 300 in a circumferential shifting movement to initiate the separation of the first body 100 from the second body 200 and optionally to allow separation of adjacent circumferential portions of the belt 300, or of separate adjacent belts 300.

Figure 9:
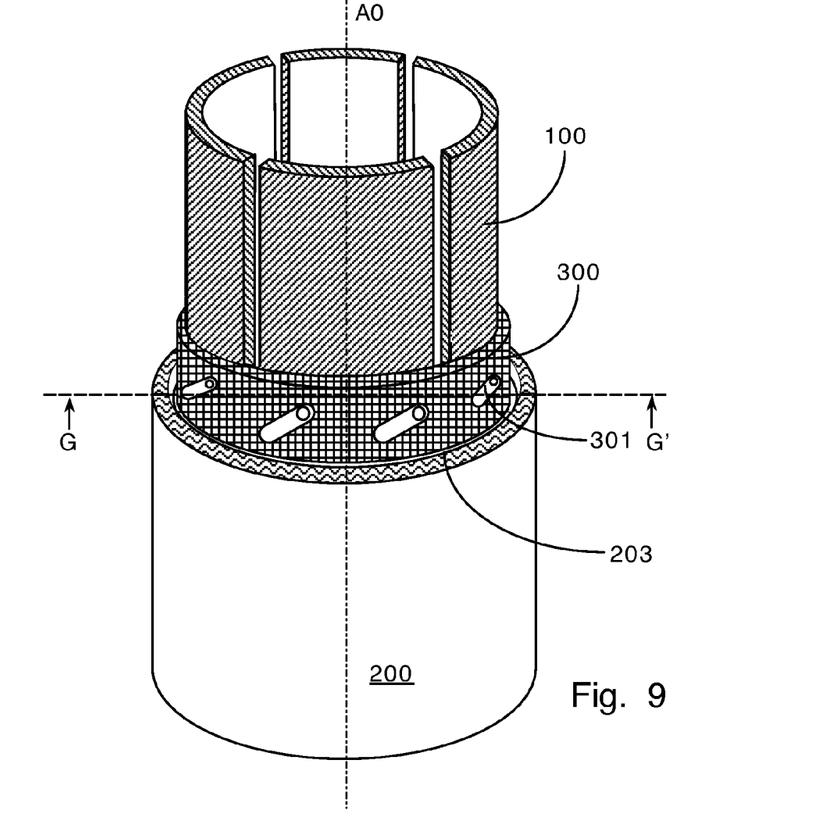
FIG. 9 is a schematic perspective diagram, depicting a fourth embodiment the system of the present invention, wherein multiple first bodies are connected to the second body by a single belt and a corresponding mechanical fixation means.

FIG. 9 is a schematic perspective diagram depicting a fourth embodiment the system of the present invention, wherein multiple first bodies 100 are connected to the second body 200 by a single belt 300 and corresponding mechanical fixation means 301. The concept of radial fixation by means of the belt 300 being received in a circumferential trench 203 described in relation with the first embodiment apply in this embodiment as well to each individual first body 100 fixed by a single belt 300, with corresponding mechanical fixation means 301.

Figure 10:
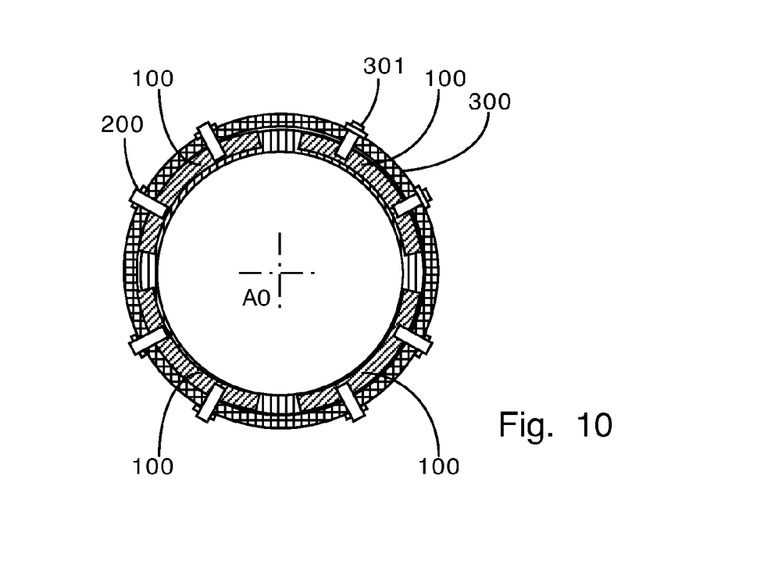
FIG. 10 is a schematic cross-section of the fourth embodiment the system of the present invention along line G-G' on FIG. 9.

FIG. 10 shows schematic cross-section of the fourth embodiment the system of the present invention along line G-G' on FIG. 9 depicting the arrangement of multiple first bodies 100 connected to the second body 200 by a single belt 300.

Figure 11A:
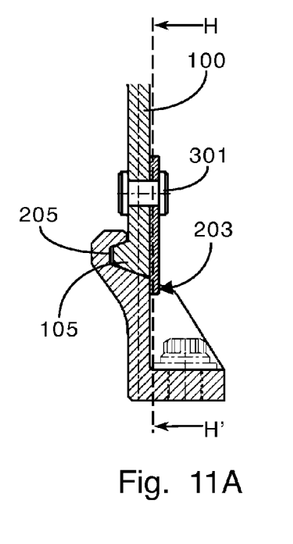
FIG. 11A: connection of the two bodies.
Figure 11B:
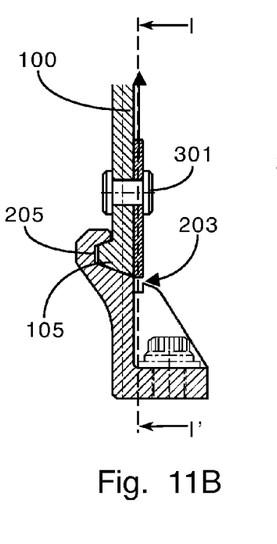
FIG. 11B: initiation of the separation.
Figure 11C:
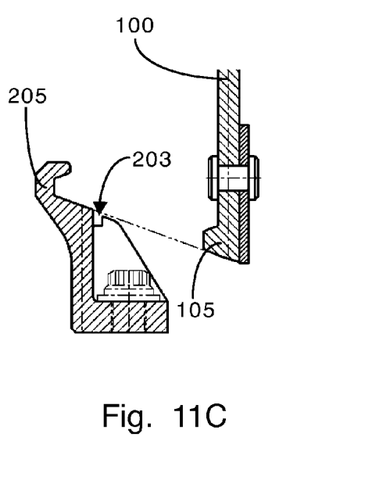
FIG. 11C: separation of the two bodies.

The sequence of FIGS. 11A to 11C show schematic cross sections of a preferred embodiment the system of the present invention, depicting details of the first interface and the second interface comprising first axial retention means 105 and second axial retention means 205 respectively. As seen on this sequence of figures, the first axial retention means 105 and the second axial retention means 205 are a pair of matching profiles of the first interface 101 and the second interface 201, wherein this matching profile is designed such, that it prevents an axial dislocation of the first body 100 with respect to the second body 200 when the first body 100 is radially fixed with respect to the second body 200. In the preferred embodiment shown on FIGS. 11A to 11C, the first axial retention means 105 and second axial retention means 205 are a pair of matching ear and plug arrangement of the profiles of the first interface 101 and the second interface 201, wherein the first axial retention means 105 is a radial extension of the first interface 101 which is received by the second axial retention means 205 which is a radial cut-out or groove in the second interface 201.

FIG. 11A shows the preferred embodiment of the present invention, wherein the belt 300 and trench 203 arrangement prevents radial dislocation of the first body 100 with respect to the first body 100, and thus the pair of first axial retention means 105 and second axial retention means 205 prevent an axial dislocation.

When the belt 300 is forced by the releasing mechanism 303 (not shown here) out of the circumferential trench 203, as shown on FIG. 11B, the prevention of axial dislocation provided by the first axial retention means 105 in combination with the second axial retention means 205 ceases to exist and the first body 100 is free to separate from the second body 200 as shown on FIG. 11C.

Figure 12A:
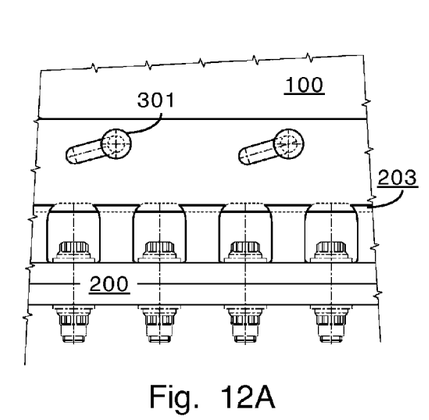
FIG. 12A is a cross section of the preferred embodiment the system of the present invention along the line H-H' on FIG. 11A, depicting details of the mechanical fixation means while the two bodies are connected.

FIG. 12A is a cross section of the preferred embodiment the system of the present invention along the line H-H' on FIG. 11A, depicting details of the mechanical fixation means 301 while the two bodies are connected and said belt 300 is received in the circumferential trench 203. In the depicted embodiment, the mechanical fixation means 301 comprises at least a pair of one elongated and inclined hole 305 and a bolt 307.

Figure 12B:
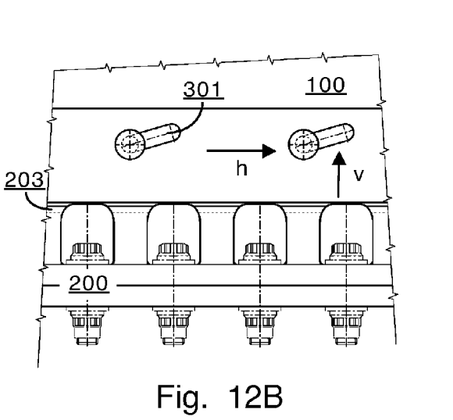
FIG. 12B is a cross section of the preferred embodiment the system of the present invention along the line I-I' on FIG. 11B, depicting details of the mechanical fixation means at the initiation of the separation.

FIG. 12B shows a cross section of the preferred embodiment the system of the present invention along the line I-I' on FIG. 11B, depicting details of the mechanical fixation means 301 at the initiation of the separation, showing the collaboration of the bolt 307 with the elongated and inclined hole 305 so that a circumferential shifting movement indicated by arrow h induces an axial movement indicated by arrow v. The circumferential shifting movement indicated by arrow h will lead to the belt 300 being removed from the circumferential trench 203, releasing it from the radial fixation enforced by the circumferential trench 203, allowing the first body 100 to separate from the second body 200.

Figure 13A:
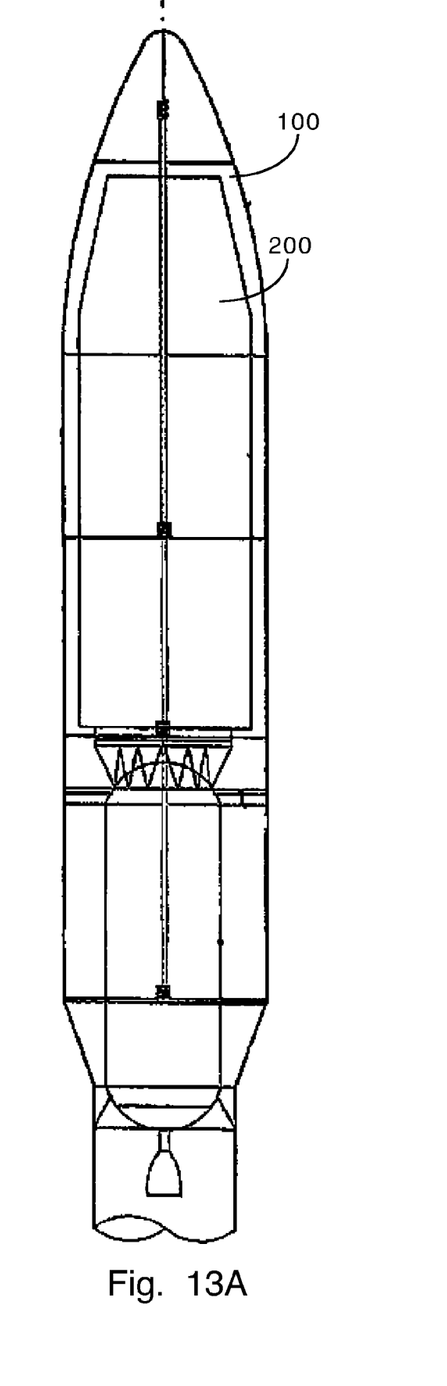
FIG. 13A is a schematic side view of a launch vehicle or spacecraft wherein a payload fairing is connected with the launch vehicle or spacecraft by means of a system according to the present invention while the two are connected.

FIG. 13A is a schematic side view of a launch vehicle or spacecraft wherein a payload fairing, corresponding to the first body 100, is connected with the launch vehicle or spacecraft, corresponding to the second body 200, by means of a system according to the present.

Figure 13B:
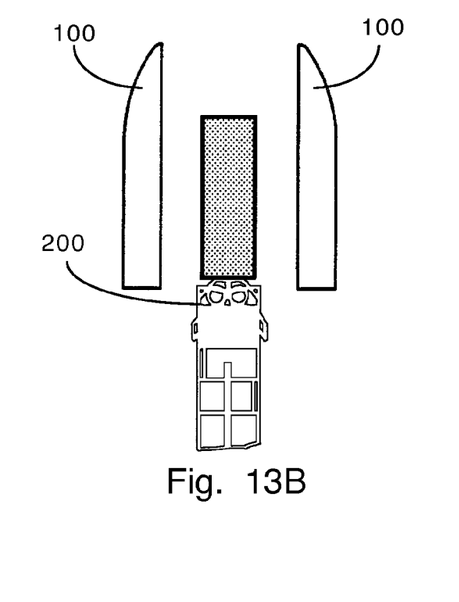
FIG. 13B is a schematic side view of a launch vehicle or spacecraft wherein a payload fairing is connected with the launch vehicle or spacecraft by means of a system according to the present invention at the separation stage.

FIG. 13B shows a schematic side view of the launch vehicle or spacecraft depicted on FIG. 13A at the separation stage, when the payload fairing, corresponding to the first body 100, separates from the launch vehicle or spacecraft, corresponding to the second body 200.

Figure 14:
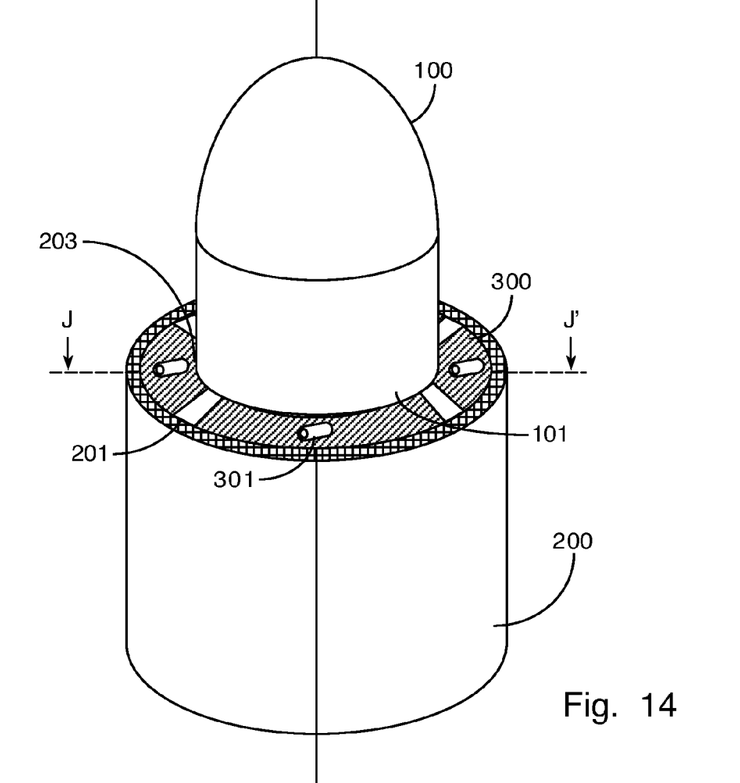
FIG. 14 is a schematic perspective diagram, depicting a further embodiment the system of the present invention, wherein the first body and the second body are coaxially arranged one above/on top of the other and the belt is radially received in said circumferential trench for an axial fixation with relation to the second body and wherein said induced relative movement of the belt is a radial movement.

FIG. 14 shows a schematic perspective diagram, depicting a further embodiment the system of the present invention. As opposed to the other embodiments hereinbefore presented, in this embodiment of the present invention, the first body 100 and the second body 200 are coaxially arranged one above/on top of the other and the belt 300 is radially received in said circumferential trench 203 for an axial fixation with relation to the second body 200 and wherein said induced relative movement of the belt 300 is a radial movement.

Furthermore, the present invention can be applied without departing from its inventive concept at any fixation/release angle not only in the radial respectively axial directions depicted in the drawings. The depicted embodiments are merely examples in some of the more common, axial/radial directions.

A first body 100, for example rocket head, with a first interface 101 is connected with a second interface 201 of a second body 200, here a cylindrical body. The interface 101 of the first body 100 is further provided with a circumferential trench 203 for radially receiving at least a circumferential portion of the belt 300. When said circumferential portion of the belt 300 is received in the circumferential trench 203, an axial fixation of the belt 300 with relation to the second body 200 is achieved. As seen on FIG. 14, the belt 300 surrounds, at least partially, the first body 100 and thus when it is axially fixed with respect to the second body 200 it provides a corresponding axial fixation of the first body 100 with respect to the second body 200 too.

Figure 15:
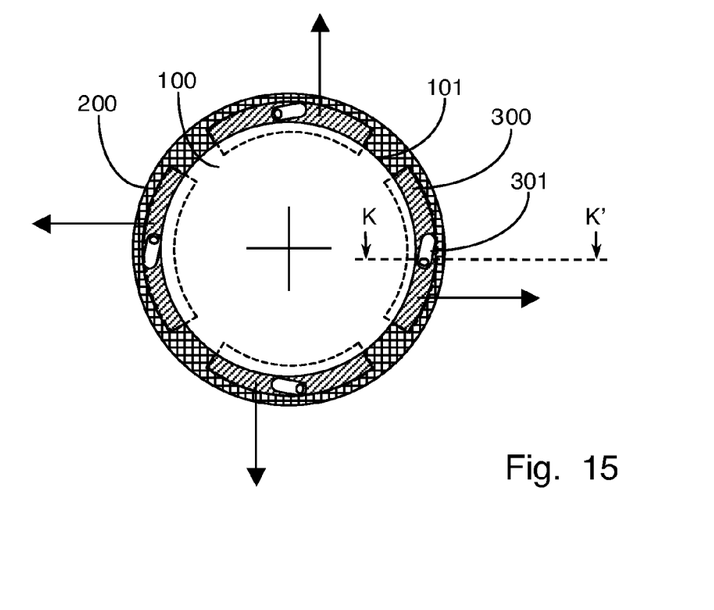
FIG. 15 is a schematic cross-section of the further embodiment of the system of the present invention along line J-J' on FIG. 14.

FIG. 15 depicts a cross-section of the embodiment the system of the present invention along line J-J' on FIG. 14. The arrangement of the first body 100 on top of the second body 200 can be seen here. The belt 300, fixed within the circumferential trench 203, surrounds at least partially the first body 100 and is fixed thereto by mechanical fixation means 301. These mechanical fixation means 301 attach a circumferential portion of the belt 300 to a circumference of the first body 100.

Figure 16A:
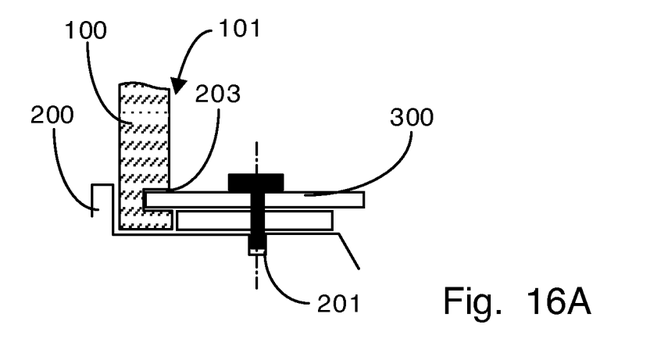
FIG. 16A: connection of the two bodies.
Figure 16B:
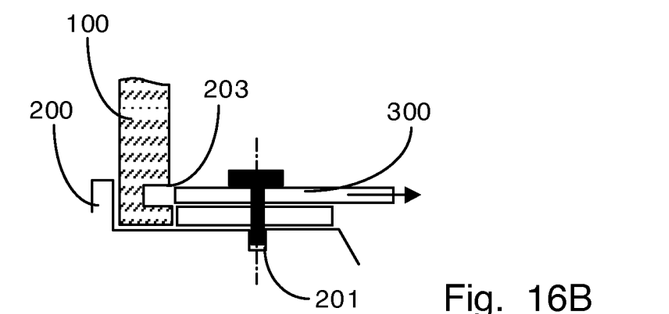
FIG. 16B: initiation of the separation.
Figure 16C:
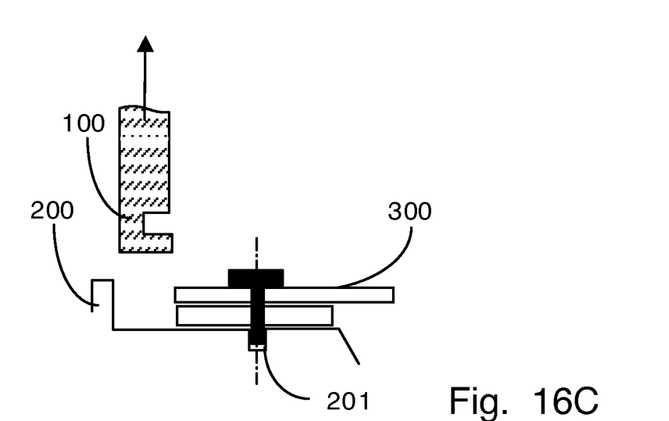
FIG. 16C: separation of the two bodies.

FIGS. 16A to 16C depict a sequence of schematic cross sections of the embodiment of the system of the present invention along line K-K' on FIG. 15.

FIG. 16A shows the system of the present invention when the first body 100 is connected to the second body 200 by means of the belt 300 being axially fixed in the circumferential trench 203. By a corresponding profile of the circumferential trench 203, an axial dislocation of the belt 300 from the circumferential trench 203 is prevented. Thus, the first body 100 is axially fixed with respect to the second body 200.

FIG. 16B shows the system of the present invention when the separation of the first body 100 from the second body 200 has been initiated by inducing a radial movement of said circumferential portion of said belt 300 with respect to said circumference of said first body 100 in order to radially remove said circumferential portion of said belt 300 from said circumferential trench 203. Thus, as seen on this FIG. 16C, once belt 300 is not retained anymore in the circumferential trench 203, the first body 100 is free to axially separate from the second body 200.

It will be understood that many variations could be adopted based on the specific structure hereinbefore described without departing from the scope of the invention as defined in the following claims.

REFERENCE LIST first body 100
first interface 101
first axial retention means 105
separation means 109
second body 200
second interface 201
circumferential trench 203
second axial retention means 205
belt 300
mechanical fixation means 301
releasing mechanism 303
elongated and inclined hole 305
bolt 307

What is claimed is:

1. A system for a launch vehicle or spacecraft for releasably connecting a circumferentially segmented first body having a first interface to a second body having a second matching interface, said first body and said second body being coaxially arranged, said system comprising:
a belt for releasably securing said first body to said second body,
a circumferential, axially indented trench provided at said second interface for axially receiving at least a portion of said belt in order to provide for a radial fixation of said portion of said belt with relation to said second body,
mechanical fixation means provided at said first body and adapted to movably attach said portion of said belt to a circumference of said first body, such that said portion of said belt can be shifted in a circumferential shifting movement with respect to said circumference of said first body, and
a releasing mechanism adapted to provide said circumferential shifting movement, wherein said circumferential shifting movement induces an axial movement of said portion of said belt with respect to said circumference of said first body, and the axial movement removes said portion of said belt from said trench and initiates a separation of the first body from the second body.

2. A system for a launch vehicle or spacecraft for releasably connecting a first body having a first interface to a second body having a second interface matching the first interface, said first body and said second body being coaxially arranged, said system comprising:
   a belt for releasably securing said first body to said second body;
   a circumferential, radially indented trench provided at said first interface for radially receiving at least a portion of the belt in order to provide for an axial fixation of said portion of the belt with relation to said first body;
   mechanical fixation means provided at said second body and adapted to moveably attach the portion of the belt to a circumference of said second body, such that the portion of the belt can be shifted in a circumferential shifting movement with respect to the circumference of said second body; and
   a releasing mechanism adapted to provide the circumferential shifting movement,
   wherein the circumferential shifting movement induces a radial movement of the portion of the belt relative to the circumference of said second body, and the radial movement removes the portion of the belt from the trench and initiates a separation of said first body from said second body.

3. A system according to claim 1, wherein said first interface and said second interface comprise first axial retention means and second axial retention means for preventing axial dislocation of said first body with respect to the second body when said first body is radially fixed to said second body by the belt.

4. A system according to claim 1, wherein a multitude of circumferentially segmented first bodies are connected to the second body by means of a multitude of belts with corresponding multitude of mechanical fixation means.

5. A system according to claim 4, wherein adjacent belts are releasably connected by said releasing mechanism.

6. A system according to claim 1, wherein said first body comprises separation means for initiating a separation of the first body into multiple circumferential segments.

7. A launch vehicle or spacecraft comprising a system according to claim 1, wherein said first body is a payload fairing and said second body is part of the spacecraft itself.

8. A method for a launch vehicle or spacecraft for releasably connecting a circumferentially segmented first body with a first interface and a second body with a second matching interface, said first body and said second body being coaxially arranged, said method comprising the steps of:
   providing a belt for releasably securing said first body to said second body;
   providing a circumferential, axially indented trench at said second interface for axially receiving at least a portion of said belt in order to provide for a radial fixation of said portion of said belt with relation to said second body;
   movably attaching said portion of said belt to a circumference of said first body by mechanical fixation means provided at said first body; and
   causing a circumferential shifting movement of said portion of said belt with respect to said circumference of said first body, by means of a releasing mechanism;
   wherein said circumferential shifting movement induces an axial movement of said portion of said belt with respect to said circumference of said first body, and said axial movement removes said portion of said belt from said trench and initiates a separation of the first body from the second body.

9. A method for a launch vehicle or spacecraft for releasably connecting a first body with a first interface and a second body with a second matching interface, said first body and said second body being coaxially arranged, said method comprising the steps of:
   providing a belt for releasably securing said first body to said second body;
   providing a circumferential, radially indented trench at said second interface for radially receiving at least a portion of said belt in order to provide for an axial fixation of said portion of said belt with relation to said second body;
   movably attaching said portion of said belt to a circumference of said first body by mechanical fixation means provided at said first body;
   causing a circumferential shifting movement of said portion of said belt with respect to said circumference of said first body, by means of a releasing mechanism;
   wherein said circumferential shifting movement induces a radial movement of said portion of said belt with respect to said circumference of said first body, and said radial movement removes said portion of said belt from said trench and initiates a separation of the first body from the second body.

10. A launch vehicle or spacecraft comprising a system according to claim 2, wherein said first body is a payload fairing and said second body is part of the spacecraft itself.

* * * * *